United States Patent [19]
Yamamoto

[11] Patent Number: 5,956,297
[45] Date of Patent: *Sep. 21, 1999

[54] SIGNAL REPRODUCING APPARATUS USING MOVEMENT OF MAGNETIC WALL

[75] Inventor: Masakuni Yamamoto, Yamato, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,055

[22] Filed: Sep. 18, 1997

[30] Foreign Application Priority Data

Sep. 19, 1996 [JP] Japan ................................ 8-247705

[51] Int. Cl.$^6$ .................................................. G11B 11/00
[52] U.S. Cl. ............................................. 369/13; 369/116
[58] Field of Search ................................ 369/13, 14, 116, 369/110, 112; 300/59, 114; 365/122; 428/694 ML

[56] References Cited

U.S. PATENT DOCUMENTS

| | | |
|---|---|---|
| 4,912,694 | 3/1990 | Yamamoto . |
| 5,199,023 | 3/1993 | Yamamoto et al. . |
| 5,233,578 | 8/1993 | Yamamoto et al. . |
| 5,329,517 | 7/1994 | Yamaguchi et al. . |
| 5,422,865 | 6/1995 | Katayama et al. ........................ 369/13 |
| 5,428,586 | 6/1995 | Kobayashi et al. . |
| 5,517,471 | 5/1996 | Ashinuma et al. . |
| 5,539,718 | 7/1996 | Hoshi et al. . |
| 5,555,231 | 9/1996 | Yamamoto . |
| 5,577,017 | 11/1996 | Yamamoto et al. . |
| 5,581,532 | 12/1996 | Matsumura et al. . |
| 5,740,133 | 4/1998 | Tamanoi et al. ........................ 369/13 |
| 5,777,974 | 7/1998 | Yamamoto ............................ 369/112 |
| 5,786,117 | 7/1998 | Hoshi et al. ............................. 430/21 |

FOREIGN PATENT DOCUMENTS

| | | |
|---|---|---|
| 3-93058 | 4/1991 | Japan . |
| 4279710 | 10/1992 | Japan . |
| 6290496 | 10/1994 | Japan . |

*Primary Examiner*—Tan Dinh
*Attorney, Agent, or Firm*—Fitzpatrick, Cella, Harper & Scinto

[57] ABSTRACT

In a signal reproducing apparatus, information is reproduced by moving a magnetic wall on a magnetic recording medium while effecting relative movement between a light spot and the medium. A light spot is irradiated for forming a temperature distribution for moving the magnetic wall on the medium. A differential detecting unit takes a positive or negative value in accordance with a direction of magnetization in the light spot. An edge detecting unit takes a positive or negative value in accordance with directions of magnetization, before and after the magnetic wall as a boundary, in the relative moving direction in the light spot. A reproduction signal is generated on the basis of the detection result from the differential detecting unit and the detection result from the edge detecting unit.

4 Claims, 11 Drawing Sheets

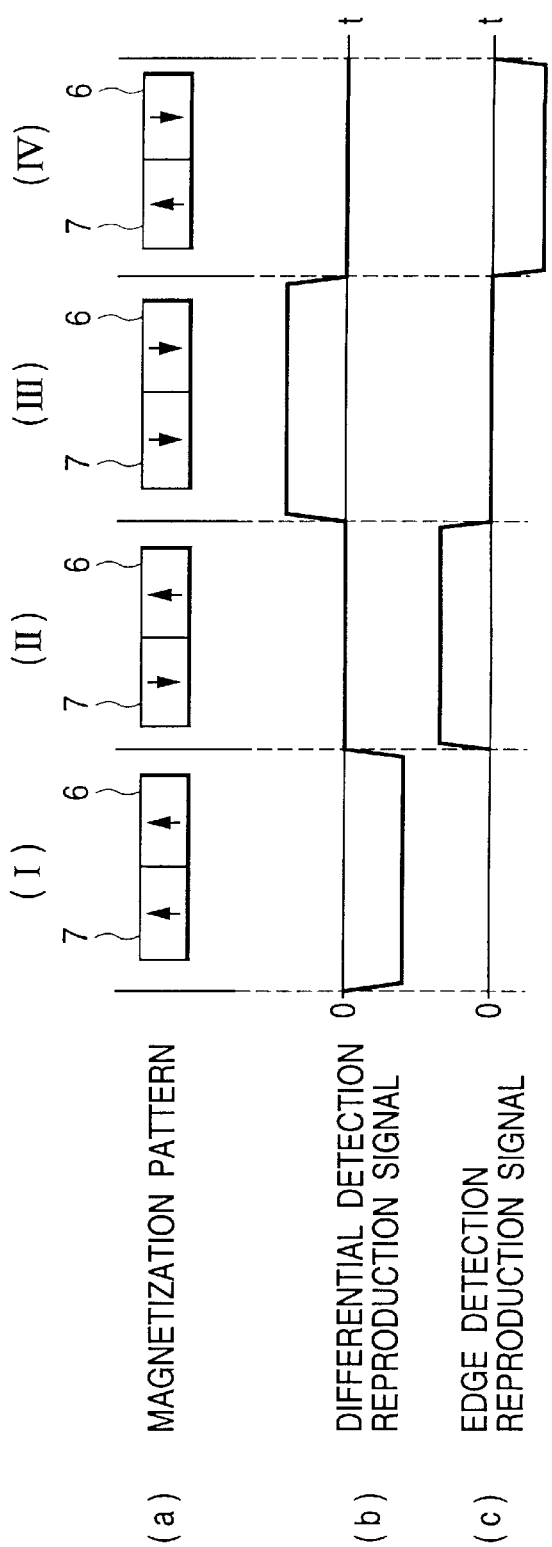

SIGNAL REPRODUCING APPARATUS USING MOVEMENT OF MAGNETIC WALL

BACKGROUND OF THE INVENTION

1. Field of the Invention

The present invention relates to a signal reproducing apparatus for reproducing recorded information by irradiating a light spot on a magneto-optical medium and, more particularly, to a signal reproducing apparatus using a magnetic wall movement reproducing method.

2. Related Background Art

Recently, a high-density magneto-optical medium by which information is recorded and reproduced by using a fine light spot has attracted attention. FIG. 1 shows an optical system of a magneto-optical recording/reproducing apparatus for performing recording and reproduction of information with respect to a magneto-optical medium. Referring to FIG. 1, this apparatus includes a semiconductor laser 28 as a light source. Divergent light emitted from the semiconductor laser 28 is collimated into a parallel light beam by a collimator lens 29. This parallel light beam from the collimator lens 29 is fed into an objective lens 32 via a beam shaping prism 30 and a polarizing beam splitter 31 and focused into a fine light spot on a magnetic layer of a magneto-optical medium 33 by the objective lens 32. Meanwhile, an external magnetic field is applied from a magnetic head 34 to the magneto-optical medium 33.

The reflected light from the magneto-optical medium 33 returns to the polarizing beam splitter 31 via the objective lens 32. A portion of the reflected light is separated by the polarizing beam splitter 31 and supplied to a control optical system. The control optical system further separates the separated light beam and supplies one separated light beam to a reproducing optical system 36 to generate an information signal. The control optical system supplies the other separated light beam to a photodetector 44 via a condenser lens 42 and a half prism 43 and to a photodetector 46 via a knife edge 45 to generate a control signal for automatic focusing or automatic tracking. The reproducing optical system 36 includes a halfwave plate 37 for rotating the polarizing direction of a light beam through 45°, a condenser lens 38 for focusing the light beam, a polarizing beam splitter 39 for separating the light beam, and photodetectors 40 and 41 for detecting the two light beams separated by the polarizing beam splitter 39. A magneto-optical signal is obtained by differentially detecting signals from the photodetectors 40 and 41.

A method of obtaining the magneto-optical signal will be described below with reference to FIG. 2. First, in the magneto-optical medium 33, information is recorded as a pit (magnetic domain) as a difference between the magnetizing directions. Therefore, when linearly polarized light is given, the polarizing direction of the linearly polarized light rotates clockwise or counterclockwise in accordance with the difference between the magnetizing directions. Assume, for example, that the polarizing direction of linearly polarized light incident on the magneto-optical medium 33 is the direction of a coordinate axis P shown in FIG. 2, reflected light for downward magnetization is R+ which is rotated +θk, and reflected light for upward magnetization is R− which is rotated −θk. When an analyzer is placed in a direction as shown in FIG. 2, light transmitting through the analyzer is A with respect to R+ and B with respect to R−. By detecting these light beams by photodetectors, information can be obtained as the difference between the light intensities. In FIG. 1, the polarizing beam splitter 39 functions as an analyzer; i.e., the polarizing beam splitter 39 is an analyzer in a direction of +45° from the P axis with respect to one separated light beam and an analyzer in a direction of −45° from the P axis with respect to the other separated light beam. That is, the signal components obtained by the photodetectors 40 and 41 have opposite phases. Accordingly, by differentially detecting these signals, a reproduction signal with reduced noise can be obtained.

As described above, in a magneto-optical medium a pit (magnetic domain) as information is recorded as perpendicular magnetization in a thin magnetic film by using thermal energy of a semiconductor laser. This information is read by using a magneto-optical effect. Recently, demands on a higher recording density of this magneto-optical medium have increased. Generally, it can be said that the linear recording density of an optical disk as one magneto-optical medium depends upon the laser wavelength of a reproducing optical system and the NA (Numerical Aperture) of an objective lens. That is, the diameter of a light spot is determined when the laser wavelength λ of a reproducing optical system and the NA of an objective lens are determined. Consequently, the size of a reproducible pit (magnetic domain) has a limitation of about $\lambda/(2NA)$. Therefore, to realize a high density in a conventional optical disk, it is necessary to shorten the laser wavelength of a reproducing optical system or increase the NA of an objective lens. However, improvements of the laser wavelength and the NA of an objective lens also have their limits. Accordingly, development of a technique is being attempted which increases the recording density by improving the construction of a recording medium or a method of reading a recording medium.

For example, Japanese Patent Application Laid-Open No. 3-93058 has proposed a reproducing method in which a signal is recorded in a recording holding layer of a multi-layered film having a reproduction layer and the recording holding layer which are magnetically coupled with each other and, after the directions of magnetization are aligned, laser light is irradiated on the reproduction layer to heat the reproduction layer, thereby reading the signal while transferring the signal recorded in the recording holding layer to the heated area in the reproduction layer. Also, Japanese Patent Application Laid-Open No. 6-290496 has proposed a magnetic wall movement reproducing method in which a light spot is irradiated on a magneto-optical medium, which is formed by stacking a plurality of magnetic layers, to transfer a pit (magnetic domain) recorded as perpendicular magnetization in a recording layer to a reproduction layer, and magnetic walls of the pit (magnetic domain) transferred to the reproduction layer are moved to make this pit (magnetic domain) larger than the pit (magnetic domain) in the recording layer, thereby reproducing the pit.

This magnetic wall movement reproducing method will be described below. FIGS. 3A to 3D are schematic views for explaining a magneto-optical medium used in the magnetic wall movement reproducing method and the action of the magneto-optical medium. FIG. 3A is a schematic view showing the surface of the magneto-optical medium. FIG. 3B is a schematic view showing the section of the magneto-optical medium. Referring to FIGS. 3A and 3B, a reproducing light spot 48 and an information track 47 on the magneto-optical medium are shown. The magneto-optical medium is constituted by three magnetic layers, i.e., first, second, and third magnetic layers 50, 51, and 52. Arrows in each layer indicate the directions of atomic spins. Magnetic walls 49 are formed in regions where the directions of spins are opposite to each other.

FIG. 3C is a graph showing a temperature distribution formed in this magneto-optical medium. Assume that in a position $X_s$ the medium temperature is a temperature $T_s$ near the Curie temperature of the second magnetic layer 51. FIG. 3D shows the distribution, which corresponds to the temperature distribution in FIG. 3C, of a magnetic energy density σ1 in the first magnetic layer 50. As shown in FIG. 3D, when a gradient of the magnetic wall energy density σ1 exists in an X direction, a force F1 is produced with respect to magnetic walls present in a position X in the individual layers. This force F1 so acts as to move the magnetic walls to a portion where the magnetic wall energy is low. In the first magnetic layer 50, magnetic wall coercivity is small, and the magnetic wall mobility is large. Therefore, the magnetic walls in the first magnetic layer 50 alone are easily moved by the force F1. However, the medium temperature is still lower than $T_s$ in a region before the position $X_s$ (on the right-hand side in FIG. 3D). Accordingly, by exchange coupling with the third magnetic layer 52 having a large magnetic wall coercivity, magnetic walls in the first magnetic layer 50 are fixed to positions corresponding to the positions of magnetic walls in the third magnetic layer 52.

If one of the magnetic walls 49 exists in the position $X_s$ of the medium as shown in FIG. 3B, the medium temperature rises to the temperature $T_s$ near the Curie temperature of the second magnetic layer 51, and this breaks the exchange coupling between the first and third magnetic layers 50 and 52. As a consequence, the magnetic wall 49 in the first magnetic layer 40 instantaneously moves, as indicated by an arrow, to a region where the temperature is higher and the magnetic wall energy density is lower. That is, when the reproducing light spot 48 passes by, the magnetic wall moves as described above, and atomic spins in the first magnetic layer 50 in the spot are pointed in the same direction. The magnetic wall instantaneously moves as the medium moves, and all atomic spins in the light spot are reversed and pointed in the same direction. Consequently, a signal reproduced by the light spot always has a fixed amplitude regardless of the size of a pit (magnetic domain) recorded in the third magnetic layer 52; i.e., the signal is free from the problem of waveform interference resulting from optical diffraction limits. Accordingly, it is possible to reproduce a pit (magnetic domain) smaller than about λ/(2NA) which is the resolution limit determined by the laser wavelength λ and the NA of an objective lens. Consequently, the recording density can be increased.

FIG. 4 is a schematic view showing the arrangement of an optical system used in magnetic wall movement reproduction. Referring to FIG. 4, a recording/reproducing semiconductor laser 53 has a wavelength of, e.g., 780 nm. A heating semiconductor laser 55 has a wavelength of, e.g., 1.3 μm. These semiconductor lasers 53 and 55 are so arranged that their laser beams are incident as P-polarized light on a recording medium. The laser beams emitted from the semiconductor lasers 53 and 55 are shaped into substantially circular beams by beam shaping means (not shown) and converted into parallel light beams by collimator lenses 54 and 56. This optical system further comprises a dichroic mirror 57 and a polarizing beam splitter 58. The dichroic mirror 57 is so designed as to transmit 100% of light with a wavelength of 780 nm and reflect 100% of light with a wavelength of 1.3 μm. The polarizing beam splitter 58 transmits 70 to 80% of P-polarized light and reflects almost 100% of S-polarized light as a vertical component.

The parallel light beams converted by the collimator lenses 54 and 56 enter an objective lens 59 via the dichroic mirror 57 and the polarizing beam splitter 58. This part of the optical system is so designed that a light beam of 780 nm becomes large with respect to the aperture of the objective lens 59 and a light beam of 1.3 μm becomes small with respect to the aperture of the objective lens 59. Accordingly, even when the same objective lens 59 is used, the action of the NA of the lens is small to the 1.3-μm light beam, so the size of a light spot on a recording medium 60 becomes larger than that formed by the 780-nm light beam. The reflected light from the recording medium 60 is formed into a parallel light beam through the objective lens 59 and reflected by the polarizing beam splitter 58 to form a light beam 61. This light beam 61 is incident on an optical system (not shown) and subjected to, e.g., wavelength separation, thereby generating a servo error signal or an information reproduction signal.

The relationship between the recording/reproducing light spot and the heating light spot on the recording medium shown in FIG. 4 will be described below with reference to FIGS. 5A and 5B. Referring to FIG. 5A, a recording/reproducing light spot 62 has a wavelength of 780 nm, and a heating light spot 63 has a wavelength of 1.3 μm. Pits (magnetic domains) recorded in a land 65 have magnetic walls 64, and grooves 66 are also formed. A region 67 is a heated region whose temperature is raised by the heating light spot 63. In this manner, by coupling the recording/reproducing light spot 62 and the heating light spot 63 on the land 65 between the grooves 66, a temperature gradient as shown in FIG. 5B can be formed on the moving medium. The relationship between the temperature gradient and the recording/reproducing light spot 62 is as explained in FIGS. 3A to 3D. Consequently, magnetic wall movement reproduction as described above can be performed.

In the above conventional magnetic wall movement reproducing method, reproduction is performed by using a reproducing light spot and a heating light spot. This increases the number of parts such as semiconductor lasers and complicates the structure. Therefore, it is possible to simplify the structure by performing magnetic wall movement reproduction by using a reproducing light spot alone without using any heating light spot. However, when reproduction is thus performed only with a reproducing light spot, the peak of a high-temperature portion on a magneto-optical medium comes inside the reproducing light spot. Accordingly, magnetic walls move in a direction opposite to the moving direction of the magneto-optical medium and in the same direction as the moving direction of the magneto-optical medium. Consequently, the influences of the two signals mix in the reproduction signal, and this makes the information difficult to reproduce.

SUMMARY OF THE INVENTION

It is an object of the present invention to provide a signal reproducing apparatus capable of image reproduction with a single beam and performing magnetic wall movement reproduction with a simple arrangement.

The above object is achieved by a signal reproducing apparatus for reproducing information by moving a magnetic wall on a magnetic recording medium, comprising:

means for irradiating a light spot for forming a temperature distribution for moving the magnetic wall on the medium;

means for moving the light spot and the medium relative to each other;

differential detecting means for taking a positive or negative value in accordance with a direction of magnetization in the light spot;

edge detecting means for taking a positive or negative value in accordance with directions of magnetization, before and after the magnetic wall as a boundary, in the relative moving direction in the light spot; and reproducing means for generating a reproduction signal on the basis of the detection result from the differential detecting means and the detection result from the edge detecting means.

Other features and advantages of the invention will become apparent from the following detailed description taken in conjunction with the accompanying drawings.

BRIEF DESCRIPTION OF THE DRAWINGS

FIGS. 14(a) through 14(c) are views showing a differential detection reproduction signal and an edge detection reproduction signal with respect to magnetization patterns in the embodiment shown in FIG. 6.

DETAILED DESCRIPTION OF THE PREFERRED EMBODIMENT

Figure 6:
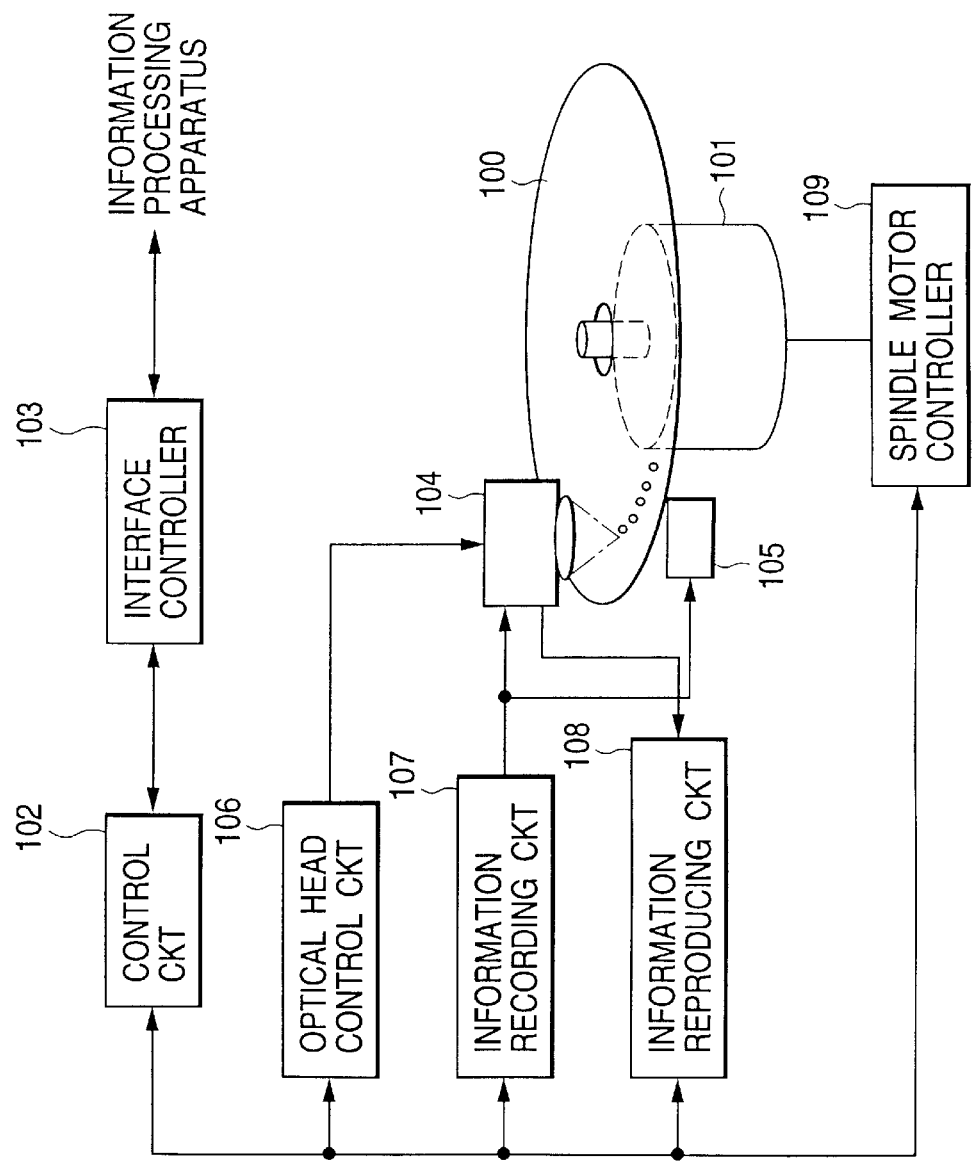
FIG. 6 is a view showing the arrangement of an embodiment of the present invention.

An embodiment of the present invention will be described in detail below with reference to the accompanying drawings. FIG. 6 is a block diagram showing the arrangement of an embodiment of the present invention. Referring to FIG. 6, a disk-like magneto-optical medium 100 for recording and reproducing information is rotated at a predetermined speed by a spindle motor 101. As this magneto-optical medium 100, a magneto-optical medium having three magnetic layers as explained in FIGS. 3A to 3D is used. As an information reproducing method, a reproducing method using magnetic wall movement is used. Also, the magneto-optical medium 100 is a cartridge type medium and can be exchanged. A control circuit 102 for controlling individual components is connected to an external information processing apparatus such as a computer via an interface controller 103. The control circuit 102 controls exchange of information with the information processing apparatus and controls recording and reproduction of information with respect to the magneto-optical medium 100 by controlling individual parts.

An optical head 104 is a recording/reproducing head for recording and reproducing information by irradiating a light beam to the magneto-optical medium 100. The optical head 104 includes various optical elements such as a semiconductor laser, an objective lens for narrowing a laser beam from the semiconductor laser into a fine light spot, and a photodetector for detecting the reflected light from the magneto-optical medium 100. The arrangement of the optical head 104 will be described in detail later. A magnetic head 105 is arranged to oppose the optical head 104 with the magneto-optical medium 100 interposed between them. This magnetic head 105 applies a magnetic field to the magneto-optical medium 100 in information recording. An optical head control circuit 106 controls the position of the optical head 104 and the position of the light beam irradiated from the optical head 104 to the magneto-optical medium 100. That is, the optical head control circuit 106 accesses a desired track by moving the optical head 104 in the radial direction of the magneto-optical medium 100, performs focus control by which the light beam from the optical head 104 is focused on the surface of the rotating magneto-optical medium 100, and performs tracking control by which the light beam from the optical head 104 follows an information track. Note that a spindle motor controller 109 controls rotation of the magneto-optical medium 100 in accordance with an instruction from the control circuit 102.

An information recording circuit 107 records information in the magneto-optical medium 100 under the control of the control circuit 102. An information reproducing circuit 108 reproduces recorded information from the magneto-optical medium 100 on the basis of a read signal from the optical head 104. When the information processing apparatus issues a recording instruction, the control circuit 102 controls the individual components to move the optical head 104 to a target information track and transfers an information signal, transmitted from the information processing apparatus, to the information recording circuit 107. The information recording circuit 107 modulates the information signal and drives the magnetic head 105 with this modulated signal. Also, the information recording circuit 107 supplies a fixed driving current for recording to the internal semiconductor laser of the optical head 104. In this manner, while a light beam with a fixed intensity is irradiated on the magneto-optical medium 100, a magnetic field modulated in accordance with the information signal is applied to record the information on the information track of the magneto-optical medium 100. As another information recording method, it is also possible to perform recording by irradiating a light beam, whose intensity is modulated in accordance with an information signal, from the optical head 104, while a magnetic field in a fixed direction is applied from the magnetic head 105.

When the information processing apparatus issues a reproduction instruction, on the other hand, the control circuit 102 controls the individual parts to move the optical head 104 to a target information track. The control circuit 102 also controls the information recording circuit 107 to supply a fixed driving current for reproduction to the internal semiconductor laser of the optical head 104. Consequently, the optical head 104 scans a fixed light beam on the information track of the magneto-optical medium 100. The optical head 104 detects the reflected light from the magneto-optical medium 100, and the information reproducing circuit 108 reproduces recorded information on the basis of the read signal. The reproduction signal is transferred to the external information processing apparatus via the interface controller 103 under the control of the control circuit 102. Although magnetic wall movement reproduction as described above is performed in this embodiment, this embodiment realizes magnetic wall movement reproduction using a single reproducing light spot by combining an optical edge reproducing method with this magnetic wall movement reproduction. This optical edge reproduction will be described below prior to explaining a reproducing operation by the embodiment.

First, a pit (magnetic domain) is formed as a difference between the directions of perpendicular magnetization in a magneto-optical medium. The formation methods are classified into two methods: one is a pit position recording method in which the center of a pit is given the meaning of information; and the other is a pit edge recording method in which the edge of a pit is given information. The recording density can be increased more by the pit edge recording than the pit position recording. Therefore, pit edge recording and reproducing methods are being extensively researched and developed recently.

Figure 2:
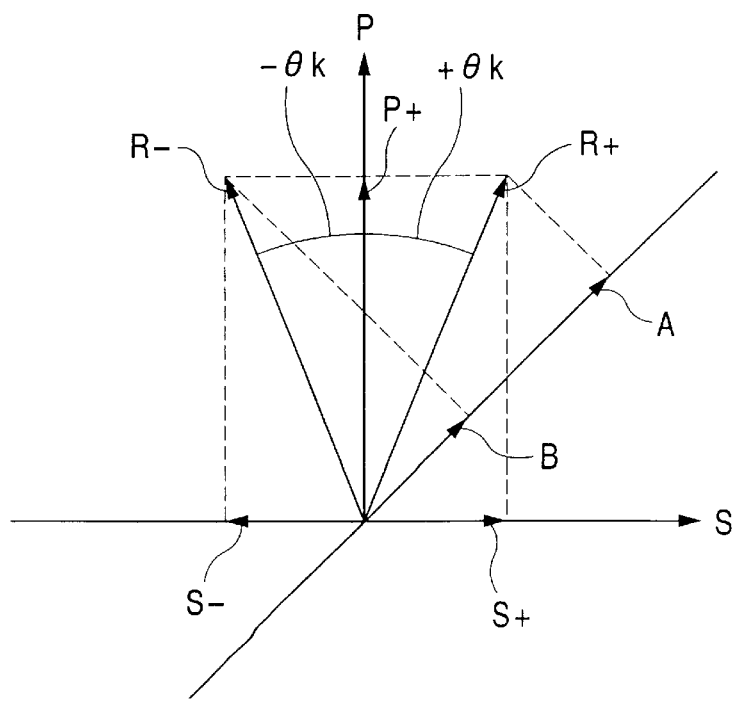
FIG. 2 is a graph for explaining the principle of magneto-optical reproduction.
Figure 3A:
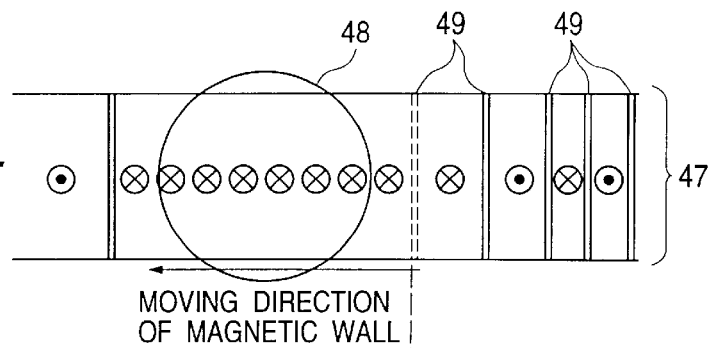
FIGS. 3A, 3B, 3C and 3D are views for explaining magnetic wall movement reproduction in the related art.
Figure 3B:
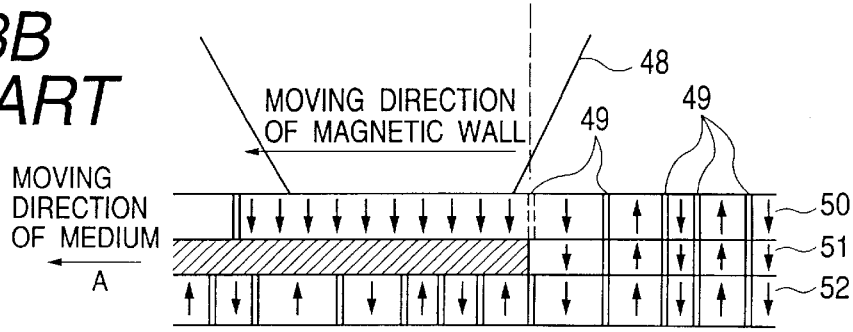
Figure 3C:
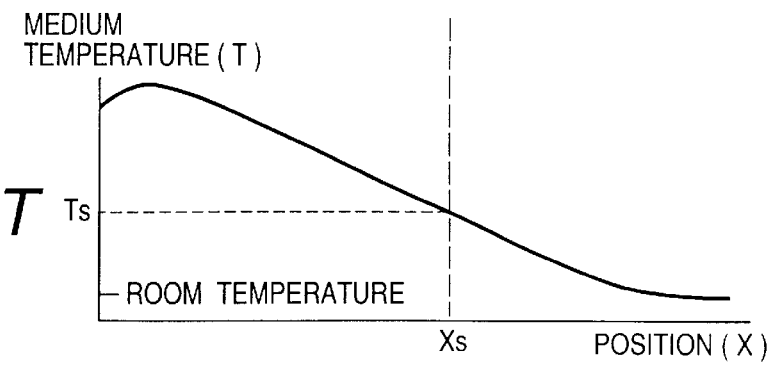
Figure 3D:
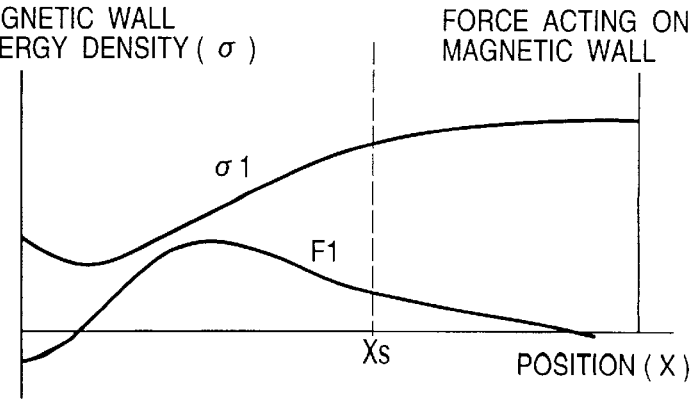
Figure 4:
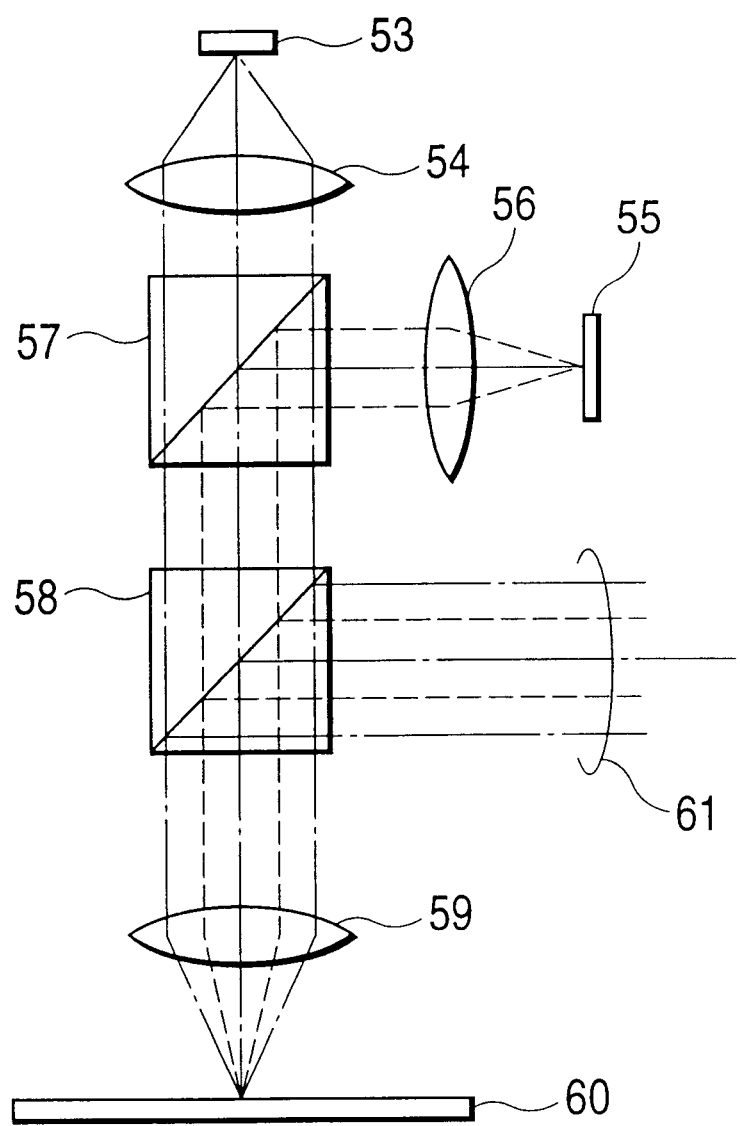
FIG. 4 is a view showing an optical system used in magnetic wall movement reproduction.
Figures 5A, 5B:
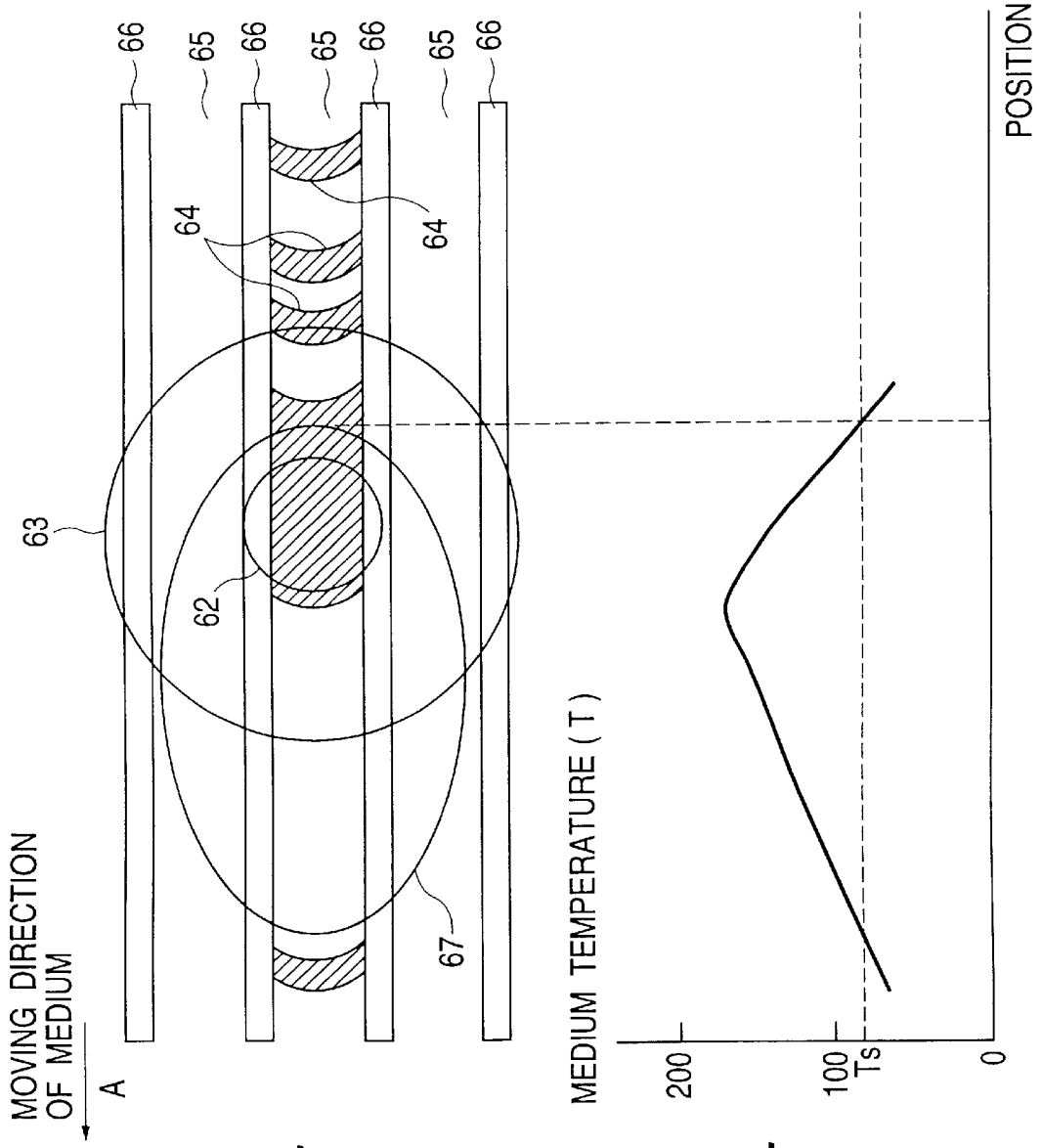
FIGS. 5A and 5B are views showing the positional relationship between two beams used in magnetic wall movement reproduction.
Figure 7:
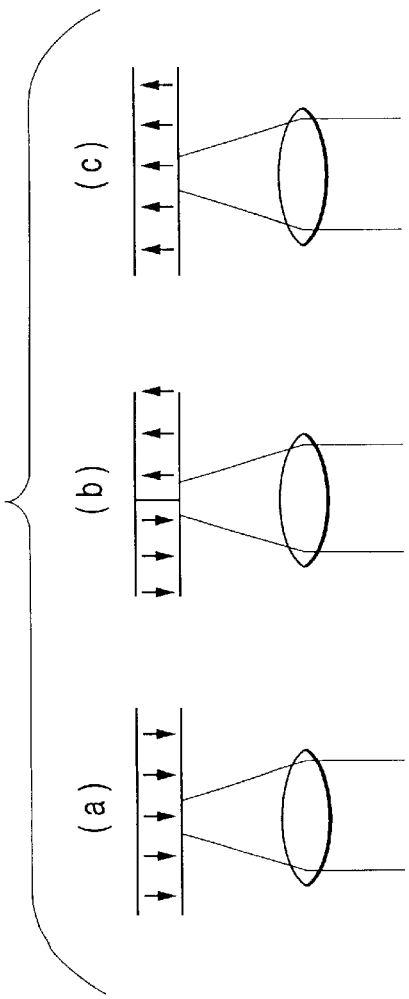
FIGS. 7(a) through 7(c) are views for explaining optical edge reproduction used in the embodiment shown in FIG. 6.

The inventor of the present application has proposed a method of optically detecting the edge of a magneto-optical pit (magnetic domain) in Japanese Patent Application Laid-Open No. 4-279710. This optical edge reproducing method will be described next. FIG. 7 shows the way a light spot moves on a pit (magnetic domain) recorded in a magneto-optical medium. Referring to FIG. 7, the light spot moves in the order of (a), (b), and (c). That is, the light spot moves from a pit (magnetic domain) with downward magnetization to a boundary region (including a magnetic wall) and further moves to a pit (magnetic domain) with upward magnetization. Consider the distribution of light on a photodetector when a light spot moves this way. Assume that, as shown in FIG. 2, reflected light from downward magnetization is R+, reflected light from upward magnetization is R−, and their P− and S-axis components are (P+, S+) and (P+, S−), respectively.

Figure 8:
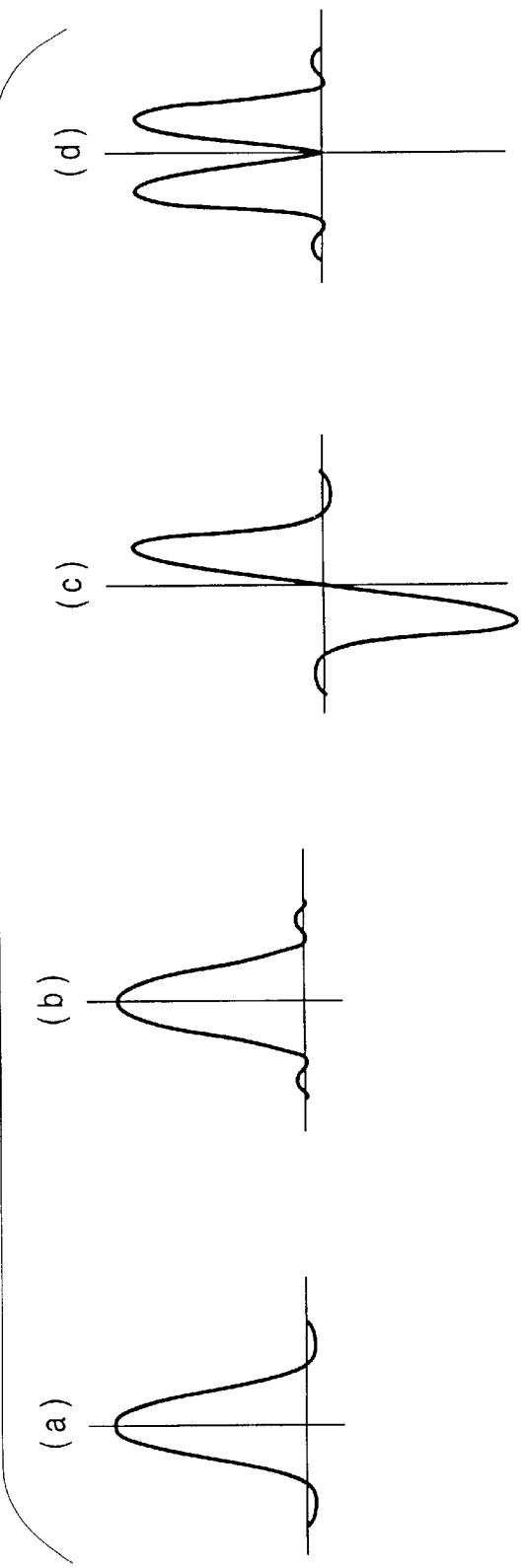
FIGS. 8(a) through 8(d) are views for explaining the optical edge reproduction used in the embodiment shown in FIG. 6.

When the light spot moves in the order of (a), (b), and (c) in FIG. 7, the P-axis component is P+, i.e., remains almost unchanged. Accordingly, the amplitude distribution of light (ignore the size and see only the shape) on a reproducing photodetector is as shown in (a) of FIG. 8, and the intensity distribution of light (ignore the size and see only the shape) is as shown in (b) of FIG. 8. There is almost no difference between them. On the other hand, the S-axis component forms a uniform distribution of S+ or S− in the light spot in (a) or (c) of FIG. 7. Consequently, the amplitude of light (ignore the size and see only the shape) on a reproducing photodetector is as shown in (c) of FIG. 8, and the intensity of light (ignore the size and see only the shape) is as shown in (d) of FIG. 8.

Figure 1:
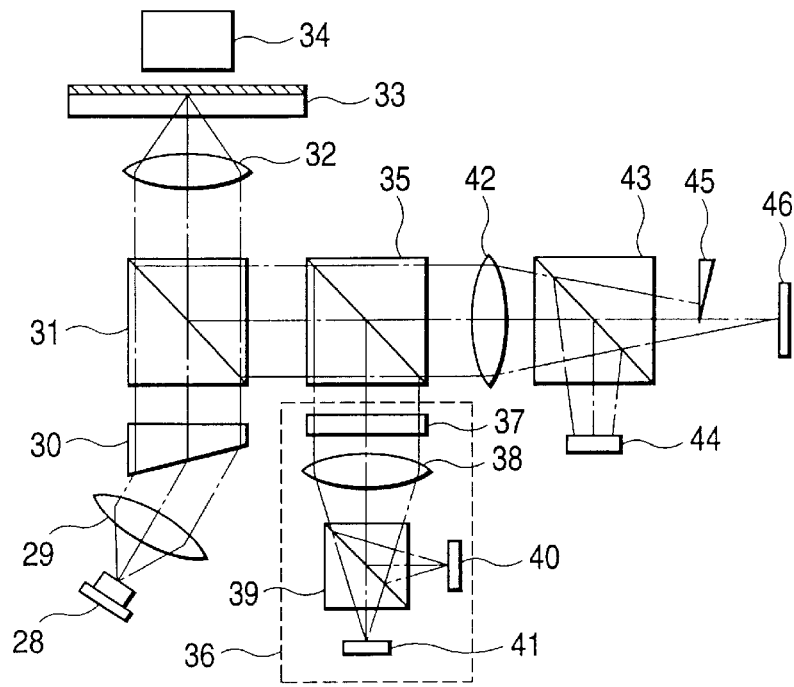
FIG. 1 is a view showing an optical system of a conventional magneto-optical recording/reproducing apparatus.
Figure 9:
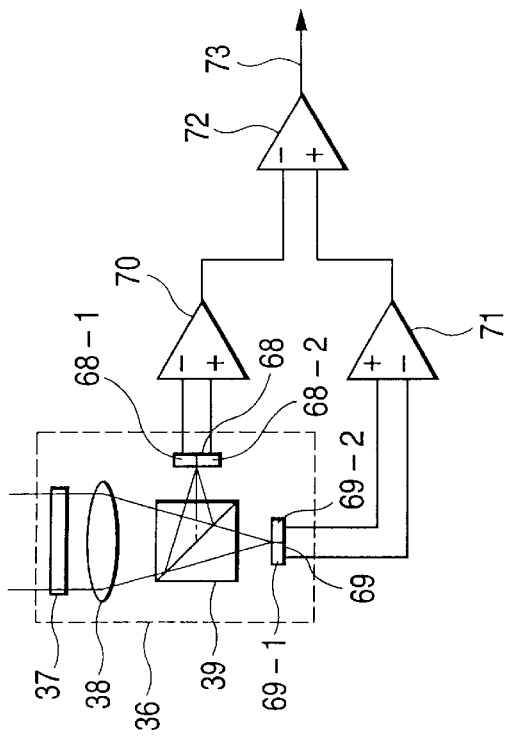
FIG. 9 is a view showing an optical system used in the optical edge reproduction.

FIG. 9 shows a reproducing optical system used in optical edge reproduction. Although FIG. 9 shows only the reproducing optical system, the same parts as in FIG. 1 can be used as the rest. Note that the same reference numerals as in FIG. 1 denote the same parts in FIG. 9. This system includes a halfwave plate 37, a condenser lens 38, and a polarizing beam splitter 39. Two-division photodetectors 68 and 69 have division lines in a direction perpendicular to information tracks on a magneto-optical medium. That is, when an information track is projected onto the two-division photodetectors by using the optical system shown in FIG. 1 and the reproducing optical system shown in FIG. 9, the image perpendicularly crosses the division lines. The system further comprises amplifiers 70, 71, and 72 for differential detection, and an edge detection reproduction signal 73 is output from the differential amplifier 72.

Figure 10:
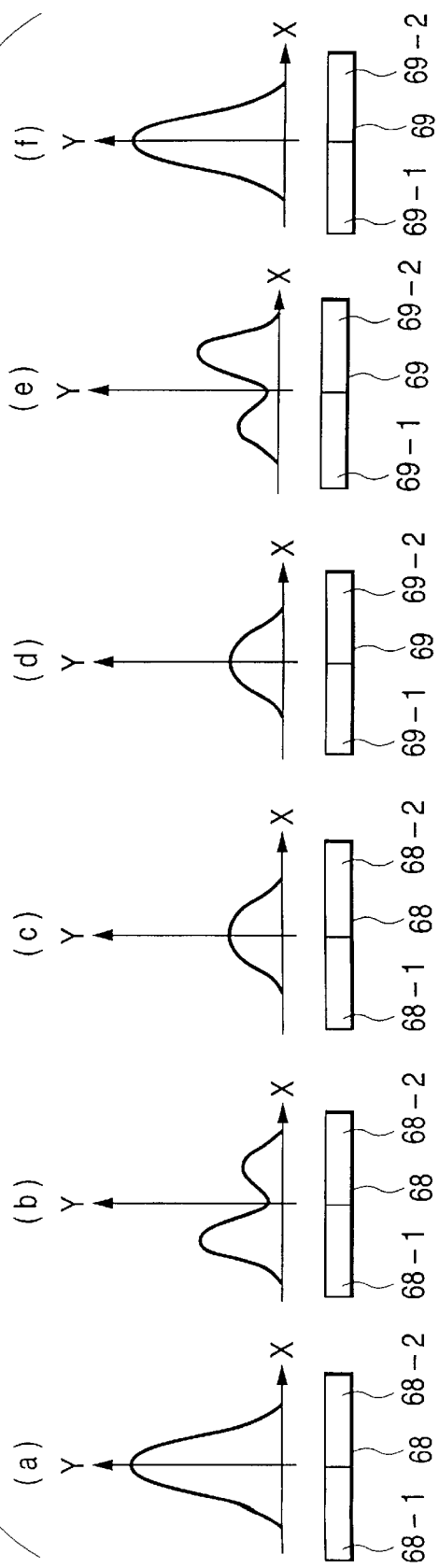
FIGS. 10(a) 10(f) are views showing distributions of light on two-division photodetectors in the optical edge reproduction.

FIG. 10 shows changes in the light intensity on the two-division photodetectors 68 and 69 when a light spot moves from a pit (magnetic domain) with downward magnetization to a pit (magnetic domain) with upward magnetization via a boundary where magnetizations are reversed as shown in FIG. 7. (a), (b), and (c) in FIG. 10 indicate changes in the light intensity on the two-division photodetector 68, and (d), (e), and (f) in FIG. 10 indicate changes in the light intensity on the two-division photodetector 69. In FIG. 10, the X axis indicates the position on the two-division photodetector shown below, and the Y axis indicates the magnitude of the intensity. The Y axis corresponds to the division line of the two-division photodetector.

When the light spot is on a pit (magnetic domain) with downward magnetization as shown in (a) of FIG. 7, the distribution of the light intensity on the two-division photodetector 68 is as shown in (a) of FIG. 10, and the distribution of the light intensity on the two-division photodetector 69 is as shown in (d) of FIG. 10. The shape of each distribution is symmetrical about the Y axis, and the intensity peak is on the Y axis. The peak size in (a) of FIG. 10 is larger than that in (d) of FIG. 10. In this case, detection signals obtained by individual photodetectors 68-1 and 68-2 of the two-division photodetector 68 are the same, and detection signals obtained by individual photodetectors 69-1 and 69-2 of the two-division photodetector 69 are the same. Therefore, both signals obtained by differential detection by the differential amplifiers 70 and 71 are 0.

In contrast, when the light spot is on a pit (magnetic domain) with upward magnetization as shown in (c) of FIG. 7, the distribution of the light intensity on the two-division photodetector 68 is as shown in (c) of FIG. 10, and the light intensity distribution on the two-division photodetector 69 is as shown in (f) of FIG. 10; i.e., (a) and (d) in FIG. 10 are replaced with each other. Similar to the above case, detection signals obtained by the individual photodetectors 68-1 and 68-2 are the same, and detection signals obtained by the individual photodetectors 69-1 and 69-2 are the same. Accordingly, both signals obtained by the differential amplifiers 70 and 71 are 0.

On the other hand, when the light spot is in a position where downward magnetization is reversed to upward magnetization as shown in (b) of FIG. 7, the distributions of the light intensity on the two-division photodetectors 68 and 69 are as shown in (b) and (e), respectively, of FIG. 10. Each distribution has two peaks on the positive side and the negative side, centering around the Y axis, of the X axis. The peak on the negative side is larger in (b) of FIG. 10, and the peak on the positive side is larger in (e) of FIG. 10. If this is the case, a signal of (68-2)−(68-1) is obtained from the differential amplifier 70, i.e., a signal of a negative value is obtained. On the other hand, a signal of (69-2)−(69-2) is obtained from the differential amplifier 71, i.e., a signal of a positive value is obtained. In addition, a signal of (differential amplifier 71)−(differential amplifier 70) is obtained when the differential amplifier 72 differentially detects the output signals from the differential amplifiers 70 and 71. Consequently, a signal of a positive value is obtained as the edge detection reproduction signal 73.

When the light spot moves from downward magnetization to upward magnetization in this manner, a peak signal of a positive value is obtained as the edge detection reproduction signal 73 in a position where the magnetizations are reversed. In contrast, when a light spot moves from upward magnetization to downward magnetization, a peak signal of a negative value is obtained by the same principle in a position where the magnetizations are reversed. In this method, the edge detection reproduction signal 73 is constantly 0 when magnetization in a light spot is uniform. When a magnetization boundary (magnetic wall) enters a light spot, a positive or negative peak signal is obtained.

Figures 11A, 11B:
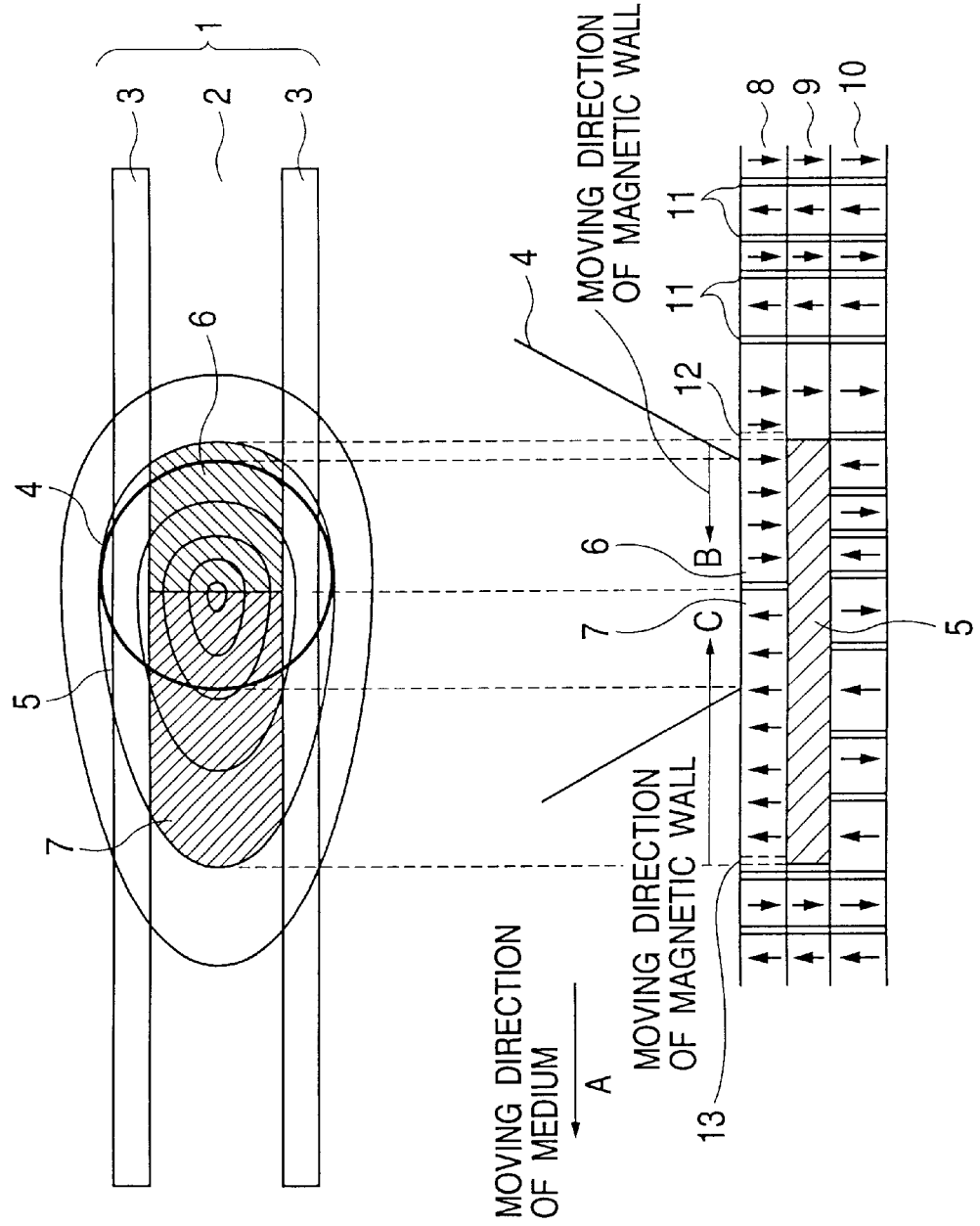
FIGS. 11A and 11B are views for explaining magnetic wall movement reproduction using a single beam in the embodiment shown in FIG. 6.

A practical information reproducing operation of this embodiment will be described below. FIG. 11A is a plan view when a light spot is irradiated on the magneto-optical medium 100. FIG. 11B shows the states of the individual magnetic layers of the magneto-optical medium 100 at that time. The magneto-optical medium 100 has an information track 1, a land 2, and grooves 3. Each groove 3 has a function of blocking the influence of magnetic wall movement from an adjacent information track. For this purpose, these grooves are made deeper than conventional grooves, or only these grooves are annealed to erase magnetization. A light spot 4 is used in reproduction (recording). In reproducing information, the optical head 104 irradiates the light spot 4 with an optical power of a fixed intensity by which no recording is performed.

When the light spot 4 is thus irradiated, a temperature distribution indicated by oval contour lines is formed on the magneto-optical medium as shown in FIG. 11A. The moving direction of the magneto-optical medium 100 is the direction of an arrow A (to the left in FIG. 11A). The magneto-optical medium 100 is the one shown in FIGS. 3A to 3D as described earlier and includes first, second, and third magnetic layers 8, 9, and 10. The first magnetic layer 8 is a reproduction layer, the second magnetic layer 9 is an adjusting layer, and the third magnetic layer 10 is a recording layer. Arrows in each layer indicate the directions of atomic spins, and magnetic walls 11 and the like are formed in regions where the spin directions are opposite to each other.

In a high-temperature portion 5, the second magnetic layer 9 is at the Curie temperature or higher. For this reason, magnetization disappears in the second magnetic layer 9 as shown in FIG. 11B. When magnetic walls 12 and 13 of a magnetic domain recorded in the third magnetic layer 10 comes to the boundary between a low-temperature portion and the high-temperature portion 5, the magnetic wall 12 moves (in the direction of an arrow B) toward the high-temperature portion in a direction opposite to the moving direction of the medium, and the magnetic wall 13 moves (in the direction of an arrow C) toward the high-temperature portion in the same direction as the moving direction of the medium. That is, the magnetic wall 12 moves in a region 6, and the magnetic wall 13 moves in a region 7. In this state, however, the information of the magnetic wall 12 and the information of the magnetic wall 13 mix in the light spot 4, so no desired information can be reproduced. Therefore, this embodiment realizes accurate magnetic wall movement reproduction with a single beam, even if two magnetic wall movements exist in a light spot, by using the optical edge reproducing method as described previously in magnetic wall movement reproduction.

Figure 12:
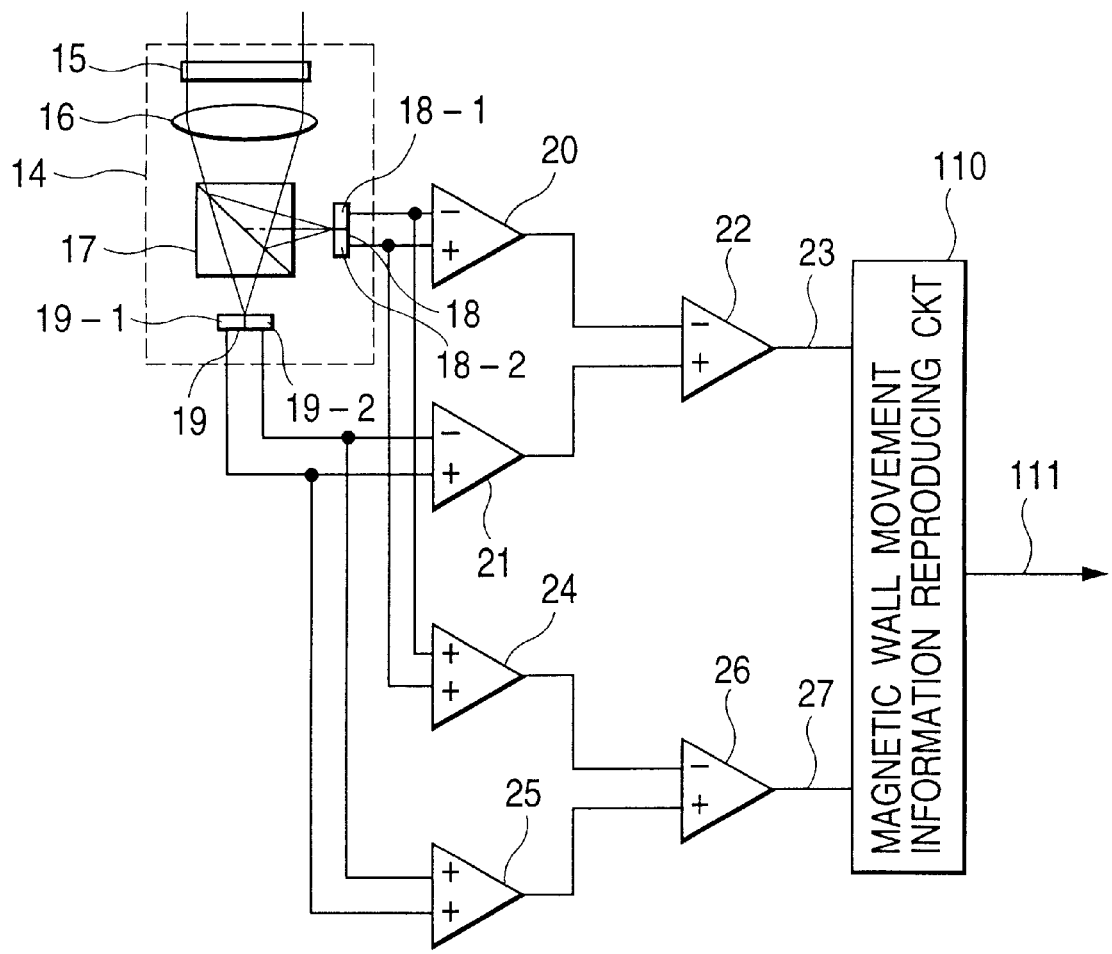
FIG. 12 is a view showing a reproducing optical system and a signal processing circuit in the embodiment shown in FIG. 6.

FIG. 12 shows a reproducing optical system and a signal processing circuit used in this embodiment. The reproducing optical system is provided in the optical head 104, and the signal processing circuit is provided in the information reproducing circuit 108. Note that although the optical head 104 incorporates an optical system including a semiconductor laser and an objective lens as explained in FIG. 1 in addition to the reproducing optical system, these components are omitted from FIG. 12. Referring to FIG. 12, elements 15 to 19 of this reproducing optical system 14 are the same as explained in FIG. 9. That is, the elements 15, 16, and 17 are a halfwave plate, a condenser lens, and a polarizing beam splitter, respectively.

The elements 18 and 19 are two-division photodetectors having division lines in a direction perpendicular to information tracks on the magneto-optical medium. Amplifiers 20 to 22 for differential detection are also the same as explained in FIG. 9. An edge detection reproduction signal 23 is obtained from the output of the differential amplifier 22. This edge detection reproduction signal is explained in FIGS. 7 to 10, so a detailed description thereof will be omitted. Addition amplifiers 24 and 25 add signals from the two-division photodetectors 18 and 19, respectively. That is, a signal of (18-1)+(18-2) is obtained by the addition amplifier 24, and a signal of (19-1)+(19-2) is obtained by the addition amplifier 25. A differential amplifier 26 obtains a signal of (addition amplifier 25)–(addition amplifier 24). The differential amplifier 26 outputs a differential detection reproduction signal 27 as in the related art shown in FIG. 1. On the basis of the edge detection reproduction signal 23 and the differential detection reproduction signal 27, a magnetic wall movement information reproducing circuit 110 reproduces recorded information and outputs the information as a magnetic wall movement information reproduction signal 111. The operation of the magnetic wall movement information reproducing circuit 110 will be described in detail later.

Figure 13:
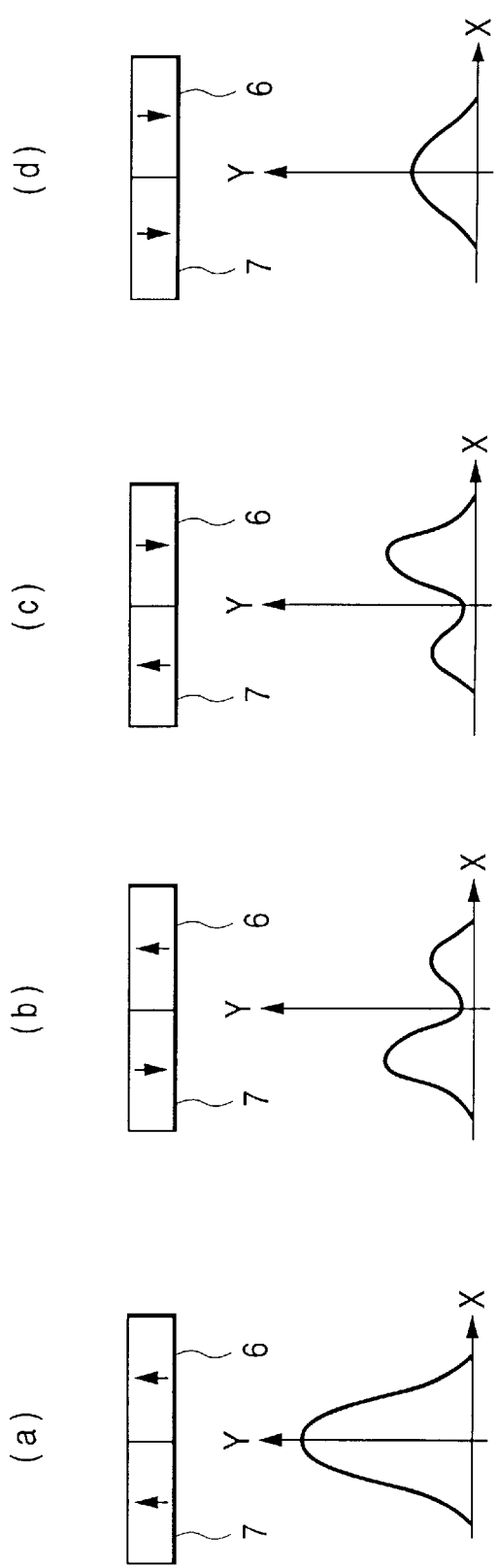
FIG. 13 (a) through 13(d) are views showing distributions of light on a two-division photodetector in the embodiment shown in FIG. 6.

Assuming that magnetic walls instantaneously move in the high-temperature regions 6 and 7 in FIGS. 11A and 11B, four types of combinations of magnetizing directions, (a), (b), (c), and (d) in FIG. 13, are obtained in the high-temperature regions 6 and 7. That is, in (a) of FIG. 13, the directions of magnetization are upward in both the regions 6 and 7. In (b) of FIG. 13, the direction of magnetization in the region 6 is upward and the direction of magnetization in the region 7 is downward. In (c) of FIG. 13, the direction of magnetization in the region 6 is downward and the direction of magnetization in the region 7 is upward. In (d) of FIG. 13, the directions of magnetization are downward in both the regions 6 and 7. Reference numerals 6 and 7 in FIG. 13 correspond to 6 and 7 in FIGS. 11A and 11B, i.e., denote the magnetic wall moving regions in the high-temperature portion 5. Assume that the regions 6 and 7 have nearly equal influences on the light spot 4.

It is ideally desirable that the regions 6 and 7 have the same size and their boundary be in the center of the light spot 4. Actually, however, the boundary between the regions 6 and 7 slightly moves in the moving direction of the magneto-optical medium 100 because the medium is moving. However, as shown in FIG. 11B, the size of the region 7 in which the magnetic wall moves is larger than that of the region 6 on the opposite side. Accordingly, by controlling the temperature rise caused by the light spot 4, i.e., by controlling the semiconductor laser driving current by an internal laser driving circuit (not shown) of the information recording circuit 107 in FIG. 6 and thereby controlling the light intensity of the light spot, the influences of the light spot 4 on the reproduction signals in the regions 6 and 7 can be made nearly equal to each other.

For the sake of simplicity, it is assumed that the sizes of the regions 6 and 7 are the same and their boundary is in the center of the light spot 4 in FIG. 13. Also, distributions indicated by (a) to (d) in FIG. 13 indicate the distributions of light on the two-division photodetector 18. Although the distributions of light on the two-division photodetector 19 are omitted, the distributions are (d), (c), (b), and (a) in FIG. 13 when the magnetization patterns are (a), (b), (c), and (d), respectively, in FIG. 13. In (a) of FIG. 13, the directions of magnetization are uniformly upward in the light spot 4, so the distribution on the two-division photodetector 18 is symmetrical about the Y axis as in (a) of FIG. 10. In (b) of FIG. 13, the boundary between downward magnetization and upward magnetization exists in the light spot 4, so the distribution on the two-division photodetector 18 has two peaks on the positive side and negative side, centering around the Y axis, of the X axis as in (b) of FIG. 10. In (c) of FIG. 13, the combination of the directions of magnetization is the reverse of that shown in (b) of FIG. 13, so the relationship between the left and right shapes of the distribution on the two-division photodetector 18 is opposite to that in (b) of FIG. 13. In (d) of FIG. 13, the directions of magnetization are uniformly downward in the light spot 4, so the distribution on the two-division photodetector 18 is symmetrical about the Y axis as in (c) of FIG. 10.

A differential detection reproduction signal and an edge detection reproduction signal obtained when the light spot 4 is scanned on an information track of the magneto-optical medium 100 will be described below with reference to FIG. 14. (a) of FIG. 14 shows magnetization patterns in the regions 6 and 7 in which the magnetic walls shown in FIGS. 11A and 11B move. Assume that, as shown in (a) of FIG. 14, the magnetization pattern changes in the order of (I), (II), (III), and (IV) when the light spot 4 is scanned on an information track. (b) of FIG. 14 shows the differential detection reproduction signal 27 obtained for the magnetization patterns in (a) of FIG. 14. The differential detection reproduction signal 27 is an output signal from the differential amplifier 26 in FIG. 12. The differential detection reproduction signal 27 is a negative signal when the directions of magnetization are uniformly upward as in magnetization pattern (I), and a positive signal when the directions of magnetization are uniformly downward as in magnetization pattern (III). When the directions of left magnetization and right magnetization are different as in magnetization pattern (II) or (IV), the value of the differential detection reproduction signal 27 is 0.

(c) of FIG. 14 shows the edge detection reproduction signal 23 obtained for the magnetization patterns in (a) of FIG. 14. The edge detection reproduction signal is an output signal from the differential amplifier 22. The edge detection reproduction signal is a positive signal when the direction of magnetization is upward in the region 6 and downward in the region 7 as in magnetization pattern (II), and a negative signal when the direction of magnetization is downward in the region 6 and upward in the region 7 as in magnetization pattern (IV). When the directions of magnetization are uniform as in magnetization pattern (I) or (III), the value of the edge detection reproduction signal is 0. In FIGS. 9 and 10, it is explained that a positive or negative peak signal is obtained at an instant the magnetic wall passes by. In FIG. 14, however, one magnetization pattern is held until it changes to the next magnetization pattern. Therefore, the edge detection reproduction signal is not a peak signal but takes a positive or negative fixed value as shown in (c) of FIG. 14.

As is apparent from the above description, the differential detection reproduction signal and the edge detection reproduction signal are independent signals with respect to the four magnetization patterns. That is, the magnetizing directions in the regions 6 and 7 cannot be specified only by the respective values of the differential detection reproduction signal and the edge detection reproduction signal. However, the magnetizing directions in the regions 6 and 7 can be identified by combining the differential detection reproduction signal and the edge detection reproduction signal. In the region 6, for example, the direction of magnetization is upward when the values of the differential detection reproduction signal and the edge detection reproduction signal are (negative, 0) or (0, positive), and downward when the values are (positive, 0) or (0, negative). Analogously, in the region 7, the direction of magnetization is upward when the values of the differential detection reproduction signal and the edge detection reproduction signal are (negative, 0) or (0, negative), and downward when the values are (0, positive) or (positive, 0).

The edge detection reproduction signal 23 and the differential detection reproduction signal 27 are output to the magnetic wall movement information reproducing circuit 110 where a reproduction signal is generated on the basis of the two signals. More specifically, the magnetic wall movement information reproducing circuit 110 samples the edge detection reproduction signal 23 and the differential detection reproduction signal 27 and outputs +1, −1, and 0 when each signal is a positive signal, a negative signal, and a 0 signal, respectively. The edge detection reproduction signal 23 and the differential detection reproduction signal 27 are represented by the combination of +1, −1, and 0 as follows. When both the directions of left magnetization and right magnetization are upward as in magnetization pattern (I) of (a) of FIG. 14, (edge detection reproduction signal 23, differential detection reproduction signal 27)=(−1, 0). When the direction of left magnetization is downward and the direction of right magnetization is upward as in magnetization pattern (II), the combination is (0, +1). When both the directions of left magnetization and right magnetization are downward as in magnetization pattern (III), the combination is (+1, 0). When the direction of left magnetization is upward and the direction of right magnetization is downward as in magnetization pattern (IV), the combination is (0, −1).

The combinations are thus four types of (−1, 0), (0, +1), (+1, 0), and (0, −1), and they are different combinations. That is, the pattern of the left magnetization and right magnetization can be unconditionally known if the combination is found. Focusing attention only on the right side of each magnetization pattern in (a) of FIG. 14, the magnetic wall movement information reproducing circuit 110 outputs a reproduction signal indicating that upward magnetization is detected as the magnetic wall movement information reproduction signal 111, when the combination of (edge detection reproduction signal 23, differential detection reproduction signal 27) is (−1, 0) or (0, +1). In contrast, when the combination is (+1, 0) or (0, −1), the magnetic wall movement information reproducing circuit 110 outputs a reproduction signal indicating that downward magnetization is detected as the magnetic wall movement information reproduction signal 111.

Focusing attention only on the left side of each magnetization pattern in (a) of FIG. 14, the magnetic wall movement information reproducing circuit 110 outputs a reproduction signal indicating that upward magnetization is detected as the magnetic wall movement information reproduction signal 111, when the combination of (edge detection reproduction signal 23, differential detection reproduction signal 27) is (−1, 0) or (0, −1). In contrast, when the combination is (0, +1) or (+1, 0), the magnetic wall movement information reproducing circuit 110 outputs a reproduction signal indicating that downward magnetization is detected as the magnetic wall movement information reproduction signal 111. The side on which attention is to be focused is previously determined in accordance with the apparatus. In this way, the magnetic wall movement information reproducing circuit 110 reproduces recorded information from the magneto-optical medium 100 and outputs the information to the control circuit 102.

In the present invention as has been described above, the differential detection reproduction signal and the edge detection reproduction signal are simultaneously detected, and recorded information in a magneto-optical medium is reproduced on the basis of these two signals. Therefore, even if magnetic walls move in two directions in a reproducing light spot, two pieces of information are not mixed, so the recorded information can be accurately reproduced. Accordingly, it is possible to accurately perform magnetic wall movement reproduction with a single beam and greatly simplify an optical system compared to a system using two beams.

What is claimed is:

1. A signal reproducing apparatus for reproducing information by moving a magnetic wall on a magnetic recording medium, comprising:

means for irradiating a light spot for forming a temperature distribution for moving the magnetic wall on said medium;

means for moving the light spot and said medium relative to each other;

differential detecting means for taking a positive or negative value in accordance with a direction of magnetization in the light spot;

edge detecting means for taking a positive or negative value in accordance with directions of magnetization, before and after the magnetic wall as a boundary, in the relative moving direction in the light spot; and reproducing means for generating a reproduction signal on the basis of the detection result from said differential detecting means and the detection result from said edge detecting means.

2. An apparatus according to claim 1, further comprising means for controlling an intensity of the light spot so that, of magnetic wall moving regions generated by the temperature distribution, a region in which the magnetic wall moves backward in the relative moving direction toward a high-temperature portion and a region in which the magnetic wall moves forward in the relative moving direction toward the high-temperature portion have essentially the same influence on the reproduction signal.

3. A method for reproducing information by moving a magnetic domain wall on a magnetic recording medium comprising:

irradiating a light spot for forming a temperature distribution for moving the magnetic domain wall on said medium;

moving the light spot and said medium relative to each other;

carrying out a differential detection for taking a positive or negative value in accordance with a direction of magnetization in the light spot;

carrying out an edge detection for taking a positive or negative value in accordance with directions of magnetization, before and after the magnetic domain wall as a boundary, in the relative moving direction in the light spot; and reproducing a reproduction signal on the basis of the detection result from said differential detection and the detection result from said edge detection.

4. The method according to claim 3, further comprising a step of controlling an intensity of the light spot so that, of magnetic domain wall moving regions generated by the temperature distribution, a region in which the magnetic domain wall moves backward in the relative moving direction toward a high-temperature portion and a region in which the magnetic domain wall moves forward in the relative moving direction toward the high-temperature portion have essentially the same influence on the reproduction signal.

* * * * *